(12) United States Patent
O'Reilly

(10) Patent No.: US 9,456,552 B2
(45) Date of Patent: Oct. 4, 2016

(54) SQUARE BALER WITH PLUNGER PROVIDING INCREASED IMPACT FORCE

(71) Applicant: AGCO Corporation, Hesston, KS (US)

(72) Inventor: David O'Reilly, McPherson, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/654,904

(22) PCT Filed: Dec. 17, 2013

(86) PCT No.: PCT/US2013/075660
§ 371 (c)(1),
(2) Date: Jun. 23, 2015

(87) PCT Pub. No.: WO2014/099909
PCT Pub. Date: Jun. 26, 2014

(65) Prior Publication Data
US 2015/0342120 A1 Dec. 3, 2015

Related U.S. Application Data

(60) Provisional application No. 61/737,894, filed on Dec. 17, 2012.

(51) Int. Cl.
*A01F 15/04* (2006.01)
*B30B 9/30* (2006.01)

(52) U.S. Cl.
CPC .............. *A01F 15/042* (2013.01); *B30B 9/305* (2013.01); *B30B 9/3021* (2013.01)

(58) Field of Classification Search
CPC .... A01F 15/042; A01F 15/101; A01F 15/10; A01F 15/04; A01F 15/0841; A01F 2015/048; B30B 9/3021; B30B 9/305; B30B 9/3057; B06B 1/18

USPC ................ 100/4, 43, 48, 50, 179, 214, 240, 100/269.01, 271, 269.05, 268
See application file for complete search history.

(56) References Cited

U.S. PATENT DOCUMENTS

| | | | | |
|---|---|---|---|---|
| 1,998,166 A | * | 4/1935 | Nelson | B30B 9/3021 100/295 |
| 2,332,170 A | * | 10/1943 | Sapp | B30B 11/225 100/193 |
| 2,608,929 A | | 6/1950 | Paradise et al. | |
| 2,654,308 A | * | 10/1953 | Millard | A01F 15/042 100/189 |
| 2,938,451 A | | 5/1960 | Seltzer | |
| 3,312,146 A | * | 4/1967 | Quere | F15B 11/123 91/180 |
| 4,503,767 A | | 3/1985 | Lucas et al. | |
| 5,080,011 A | * | 1/1992 | Paxton | B30B 9/30 100/229 A |
| 5,193,455 A | * | 3/1993 | Lackner | B30B 9/3021 100/140 |
| 6,725,766 B2 | | 4/2004 | Murrey et al. | |

OTHER PUBLICATIONS

US International Searching Authority, International Search Report for International Application No. PCT/US2013/075660, mailed May 2, 2014.

* cited by examiner

*Primary Examiner* — Jimmy T Nguyen

(57) ABSTRACT

A powered square baler is operable to form a bale by compressing loose material. The powered square baler broadly includes a chassis and a reciprocating plunger assembly. The chassis includes a baler frame that presents a baling chamber to receive the loose material. The reciprocating plunger assembly includes a plunger head and an energy storage device. The plunger head is slidably mounted relative to the frame and is operable to be driven by a power source to reciprocate into and out of the chamber and apply a compressive force against the loose material. The energy storage device stores energy from the power source and transmits the energy to the plunger head in response to the applied compressive force, with the transmitted energy causing an impulse force to be applied against the loose material by the plunger head.

10 Claims, 10 Drawing Sheets

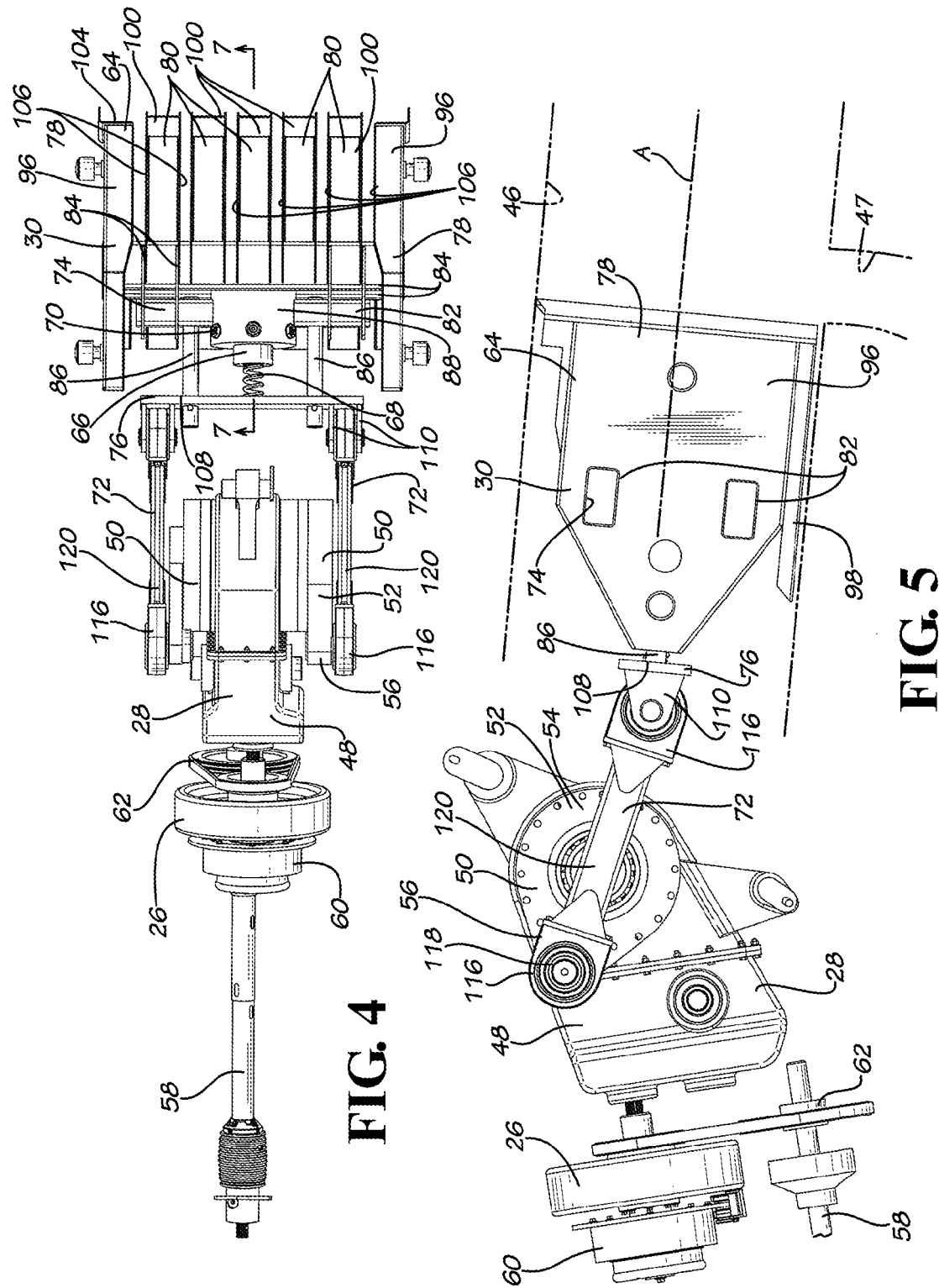

US 9,456,552 B2

SQUARE BALER WITH PLUNGER PROVIDING INCREASED IMPACT FORCE

CROSS REFERENCE TO RELATED APPLICATIONS

This application is a national phase application of international patent application number PCT/US2013/075660, filed Dec. 17, 2013, which claims priority to U.S. provisional application Ser. No. 61/737,894, filed Dec. 17, 2012. The full disclosures, in their entireties, of international patent application number PCT/US2013/075660 and U.S. provisional application No. 61/737,894 are hereby incorporated by reference.

BACKGROUND OF THE INVENTION

1. Field of Invention

This invention relates to a baling apparatus, and more particularly to a square baler with plunger providing increased impact force.

2. Description of Related Art

Conventional square hay balers include a bale forming chamber and a reciprocating plunger that slides into and out of the chamber. As the chamber receives loose hay material, the plunger slides into the chamber during a compaction stroke to compress the loose hay material into the form of a bale. Such balers typically include a drive train that transmits power to the reciprocating plunger.

However, prior art square hay balers have certain deficiencies. For instance, conventional hay balers apply very high forces to the plunger in order to complete the compaction stroke. Because these forces are transmitted by the drive train and by connecting rods that connect the drive train to the plunger, the connecting rods and drive train components must be designed to accommodate this loading.

OVERVIEW OF THE INVENTION

In one embodiment, the invention is directed to a powered square baler operable to form a bale by compressing loose material. The powered square baler broadly includes a chassis and a reciprocating plunger assembly. The chassis includes a baler frame that presents a baling chamber to receive the loose material. The reciprocating plunger assembly includes a plunger head and an impulse device. The plunger head is slidably mounted relative to the frame and is operable to be driven by a power source to reciprocate into and out of the chamber and apply a compressive force against the loose material. The impulse device transmits the energy to the plunger head in response to the applied compressive force, with the transmitted energy causing an impulse force to be applied against the loose material by the plunger head.

Another embodiment of the invention is directed to a powered square baler operable to form a bale by compressing loose material. The powered square baler broadly includes a chassis and a reciprocating plunger assembly. The chassis includes a baler frame that presents a baling chamber to receive the loose material. The reciprocating plunger assembly includes a plunger head and an energy storage device. The plunger head is slidably mounted relative to the frame and is operable to be driven by a power source to reciprocate into and out of the chamber and apply a compressive force against the loose material. The energy storage device stores energy from the power source and transmits the energy to the plunger head in response to the applied compressive force, with the transmitted energy causing an impulse force to be applied against the loose material by the plunger head.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 4 is a fragmentary top view of the square baler shown in FIGS. 1-3, showing the drive shaft, transmission, plunger drive, and plunger assembly;

FIG. 5 is a fragmentary side elevation of the square baler shown in FIGS. 1-4, showing the drive shaft, transmission, plunger drive, and plunger assembly, with the crank arms rotated so that the plunger head is in an outermost location relative to the baling chamber;

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
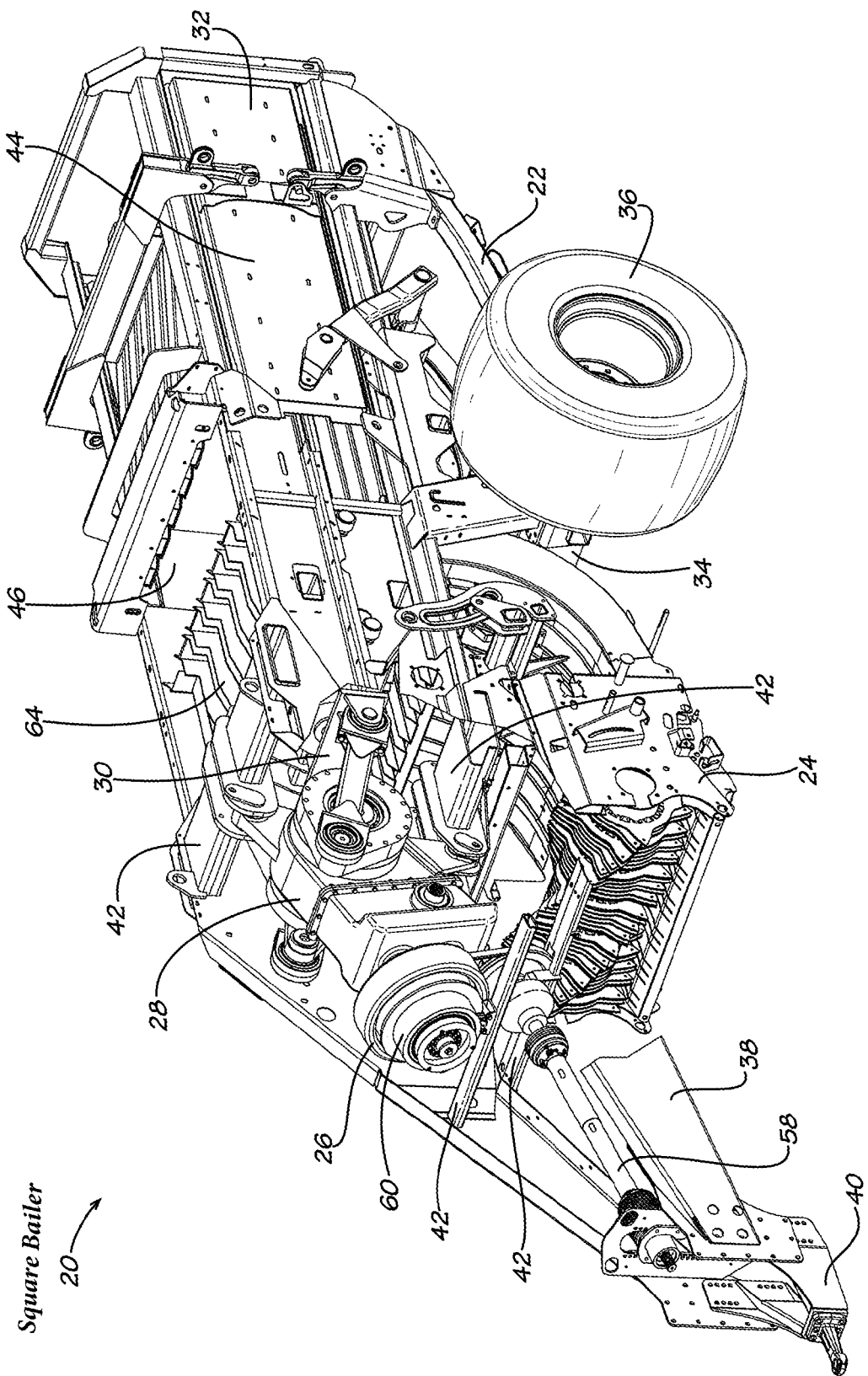
FIG. 1 is a fragmentary perspective of a square baler constructed in accordance with a preferred embodiment of the present invention, with the square baler including a wheeled chassis, a windrow pickup header, a drive shaft, a transmission, a plunger drive, and a plunger assembly, and showing the plunger assembly operably received by a baling chamber presented by the chassis.
Figure 2:
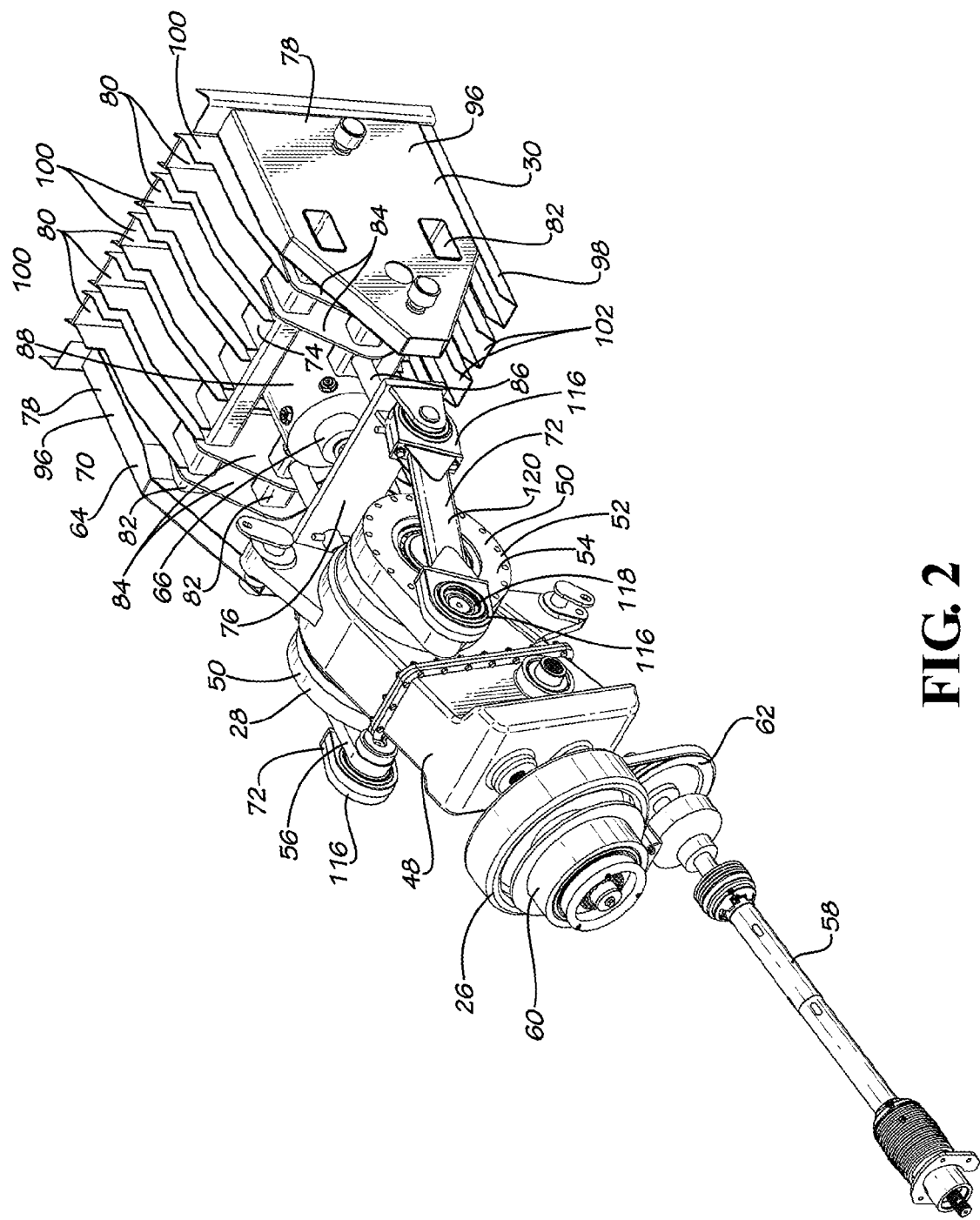
FIG. 2 is a fragmentary front perspective of the square baler shown in FIG. 1, showing the drive shaft, transmission, plunger drive, and plunger assembly, with the plunger drive including crank arms attached to connecting rods of the plunger assembly, and with the connecting rods attached to a plunger head of the plunger assembly.
Figure 3:
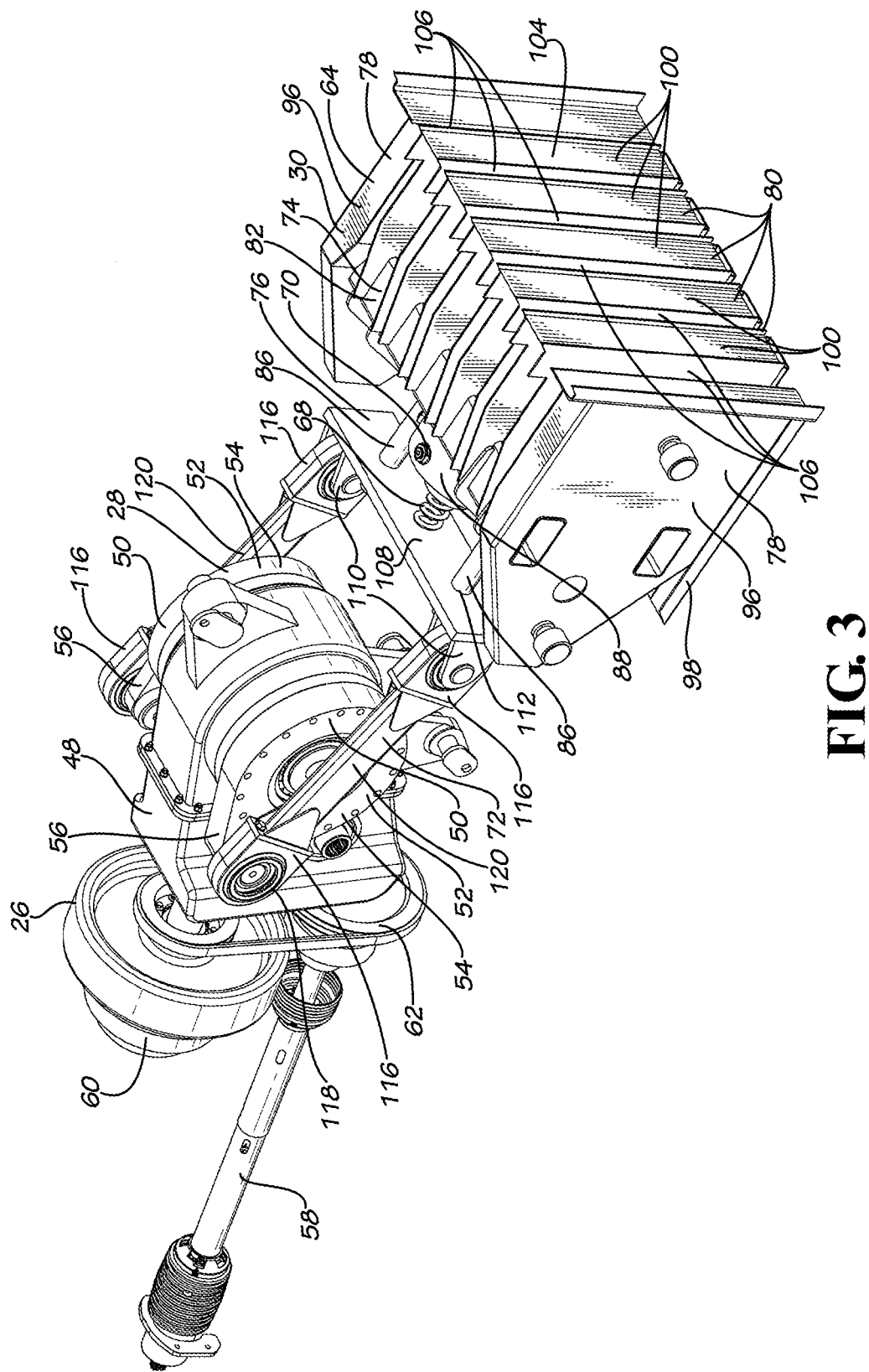
FIG. 3 is a fragmentary rear perspective of the square baler shown in FIGS. 1 and 2, showing the drive shaft, transmission, plunger drive, and plunger assembly.

Turning initially to FIG. 1, a square baler 20 is constructed in accordance with a preferred embodiment of the present invention. The illustrated baler 20 is designed to collect loose hay and form the loose hay into hay bales. The construction of baler 20 has been found to be particularly well suited for the baling of biomass material into relatively high density bales. However, the principles of the present invention are applicable where the baler 20 forms bales from other types of loose materials, such as waste material. The square baler 20 preferably includes a wheeled chassis 22, windrow pickup header 24, transmission 26, plunger drive 28, and plunger assembly 30.

Figure 6:
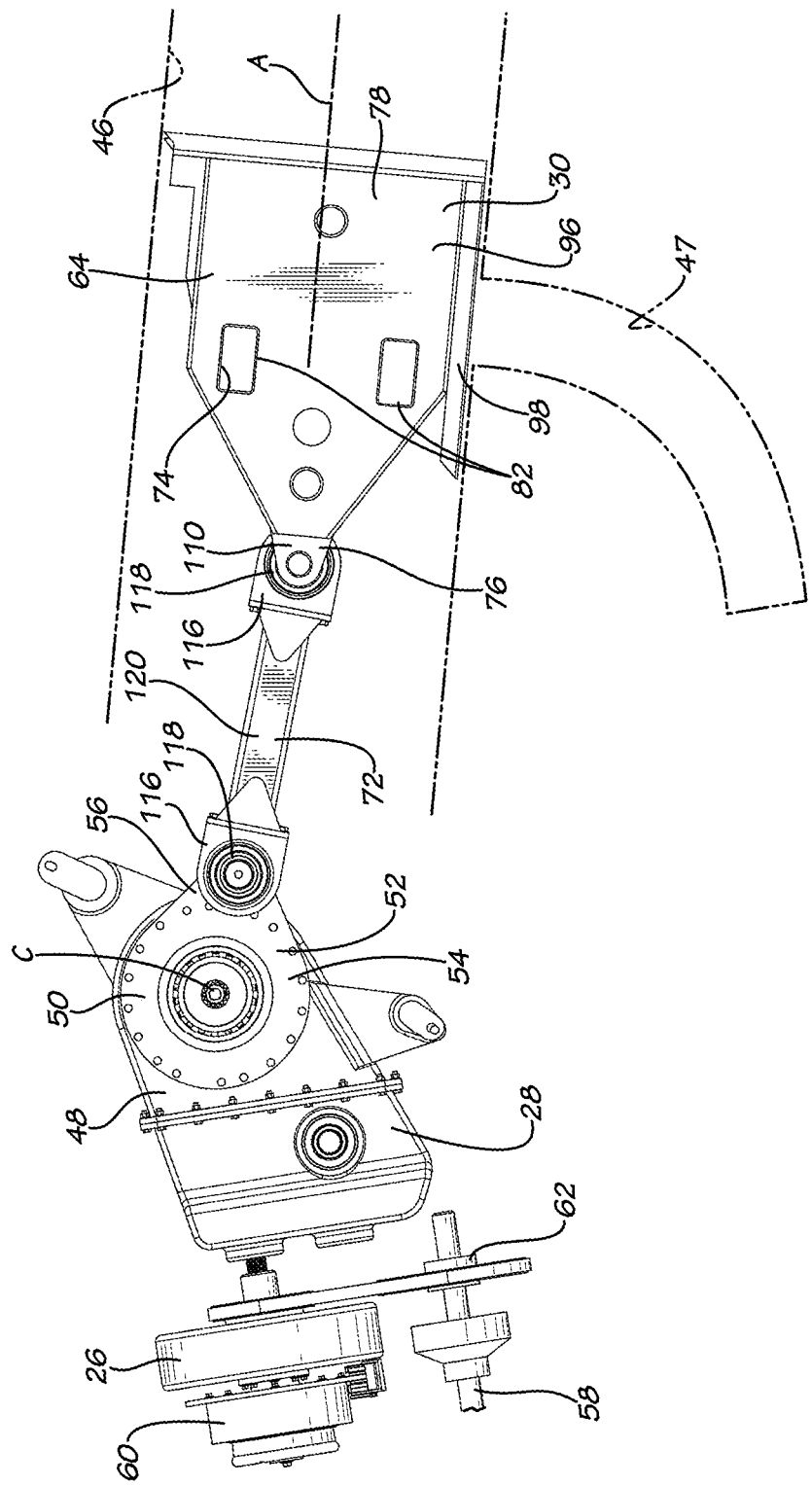
FIG. 6 is a fragmentary side elevation of the square baler similar to FIG. 5, but showing the crank arms rotated so that the plunger head is in an innermost location relative to the baling chamber.
Figure 7:
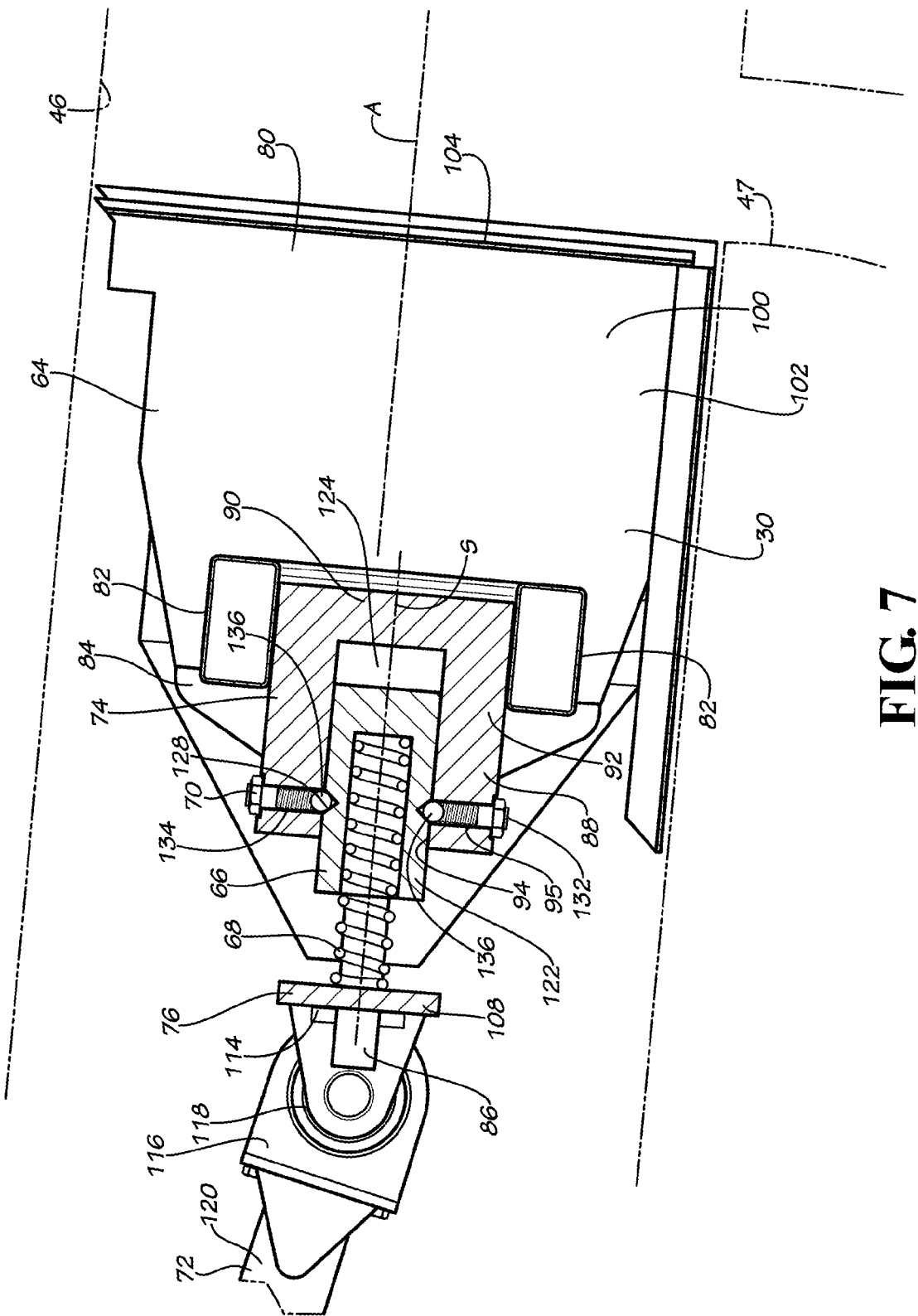
FIG. 7 is a cross section of the plunger assembly taken along line 7-7 in FIG. 4, showing the plunger head in the outermost location, with the plunger head including a head frame and slider, and with the plunger assembly also including a hammer, spring, and detent assembly.

The wheeled chassis 22 is conventional and is constructed so that the baler 20 can be towed in the usual manner by a tractor (not shown). The chassis 22 includes a baler frame 32, an axle 34 that supports the baler frame 32, and ground wheels 36 rotatably mounted on the axle 34. The illustrated baler frame 32 preferably includes a tow bar assembly 38 operable to be attached to the tractor with a hitch 40. The tow bar assembly 38 further includes lateral supports 42. The baler frame 32 also includes an enclosed bed 44 that presents a baling chamber 46. As will be discussed, the bed 44 slidably receives the plunger assembly 30 so that the plunger can reciprocate into and out of the baling chamber 46 along a longitudinal chamber axis A (see FIGS. 5 and 6). More specifically, the plunger travels into the baling chamber 46 during a compaction stroke and out of the baling chamber 46 during a retraction stroke.

The pickup header 24 is operably supported by the baler frame 32 at a location spaced between the hitch 40 and the axle 34. In the usual manner, the header 24 is operable to collect loose material from the ground and feed the collected material through a passage 47 and into the baling chamber 46 with a stuffing fork (not shown).

The plunger drive 28 is operable to transmit power from the transmission 26 to the plunger assembly 30. In particular, the plunger assembly 30 is preferably powered by the plunger drive 28 so that the plunger reciprocates into and out of the chamber 46. The illustrated plunger drive 28 preferably includes a housing 48, a gear drive (not shown), and rotating crank arms 50 attached to the gear drive.

The crank arms 50 each include a plate 52 that forms an annular body 54 and a radially outer end section 56. Each crank arm 50 is rotatably mounted relative to the housing 48 to spin continuously about a crank arm axis C (see FIG. 6). As will be discussed, each crank arm 50 is operably connected to a corresponding connecting rod of the plunger assembly 30. The illustrated plunger drive 28 is preferred for powering the plunger assembly 30. However, it is also within the scope of the present invention where an alternative drive is used to move the plunger assembly 30. For instance, one such alternative drive could be a hydraulic drive, such as a hydraulic motor or cylinder.

The transmission 26 serves to transmit power from a drive shaft 58 to the plunger drive 28. Preferably, the illustrated transmission 26 reduces the rotational speed from the drive shaft 58 to an input shaft of the plunger assembly 30. The drive shaft 58 is conventional and includes shaft sections interconnected end-to-end by a pair of universal joints (not shown). The drive shaft 58 is operable to be attached to a power take-off shaft (not shown) of the tractor. The transmission 26 preferably includes a planetary gear drive 60 and a belt drive 62 to provide the speed reduction. However, it is also within the scope of the present invention where an alternative transmission is used.

The plunger assembly 30 is constructed to reciprocate into and out of the baling chamber 46 along chamber axis A to form a bale. By reciprocating, the plunger assembly 30 permits material to be continuously introduced into the chamber 46 and compacts the material in the chamber 46 so that the bale is formed. The plunger assembly 30 preferably includes a plunger head 64, hammer 66, spring 68, detent assembly 70, and connecting rods 72.

Turning to FIGS. 3-10, the illustrated plunger head 64 preferably includes a head frame 74, slider 76, end sections 78, and interior sections 80. The head frame 74 preferably has a generally unitary form and includes lateral members 82, plates 84 that interconnect the members 82, and rods 86 attached to members 82. The rods 86 extend axially from the members 82.

Turning to FIGS. 7-10, the head frame 74 also preferably includes a generally cylindrical receiver 88 operable to slidably receive the hammer 66. The receiver 88 is preferably unitary and includes an end wall 90 and a cylindrical tube 92. The end wall 90 and tube 92 cooperatively present a cylindrical socket 94. The socket 94 presents a socket axis S that is substantially parallel to the chamber axis A. While the illustrated receiver configuration is preferred, it is within the ambit of the present invention where the receiver 88 is alternatively constructed. For instance, the receiver 88 could have an alternative shape (e.g., where the socket 94 has an alternative cross-sectional shape). The tube 92 also presents six (6) radial bores 95 that intersect the socket 94 and are spaced circumferentially about the socket 94.

Turning to FIGS. 2-10, the end sections 78 each include a body 96 having a skid 98 that slidably engages the bottom of baling chamber 46. Similarly, the interior sections 80 each include a body 100 having a skid 102 that slidably engages the bottom of baling chamber 46. The illustrated end and interior sections 78,80 are spaced laterally along and attached to the lateral members 82. Thus, the head frame 74 and sections 78,80 are preferably integrally connected with one another. The sections 78,80 cooperatively present a bale compressing surface 104 and a plurality of upright slots 106 spaced from one another.

The slider 76 preferably includes a plate 108 and supports 110 attached to the plate 108. The plate 108 presents holes 112 that receive the rods 86, with the slider 76 being retained on the rods 86 by pins 114 (see FIGS. 3 and 7-10). Thus, the slider 76 is shiftable relative to the rest of the plunger head 64 along the chamber axis A. The slider 76 is shiftable on the rods 86 into and out of an extended position where the plate 108 contacts the pins 114 (see FIG. 7).

As discussed, the plunger head 64 is preferably slidable along the chamber axis A and moves into the baling chamber 46 during a compaction stroke and out of the baling chamber 46 during a retraction stroke. The plunger head 64 and baling chamber 46 cooperatively define and enclose a chamber volume. As will be discussed, the chamber volume has a maximum value when the plunger is at an outermost location relative to the chamber 46. Conversely, the chamber volume has a minimum value when the plunger is at an innermost location relative to the chamber 46. While the head slides along a straight line, it is within the scope of the present invention where the head slides along a curvilinear direction.

The connecting rods 72 each include end housings 116, bearings 118 mounted in each of the end housings 116, and an arm 120 that interconnects the end housings 116. Each connecting rod 72 is pivotally attached to the crank arm 50 at one end and to the slider 76 at the other end. The connecting rods 72 drivingly interconnect the crank arms 50 and slider 76 so that rotation of the crank arms 50 causes reciprocating sliding movement of the slider 76. The crank arms 50 and plunger assembly 30 operate so that the crank arms 50 are rotatable between the outermost location (see FIG. 5) and the innermost location (see FIG. 6). While the illustrated rods 72 are preferred, it is also within the ambit of the present invention for an alternative structure to drivingly interconnect the plunger drive 28 and the plunger assembly 30.

Turning again to FIGS. 7-10, the illustrated hammer 66 is preferably unitary and includes a cylindrical tube 122 and an end wall 124. The tube 122 presents a bore 126 that is configured to at least partly receive the spring 68. The outer surface of the tube 122 also presents an endless groove 128 that extends circumferentially along the outer surface. As will be discussed, the groove 128 is configured to operably engage the detent assembly 70. The illustrated groove 128 preferably has a generally V-shaped cross section, with opposite groove surfaces that extend from the outer surface of the tube 122 and intersect to form an oblique angle. However, the principles of the present invention are applicable where the groove 128 has an alternative shape (e.g., a curved cross-sectional shape). The hammer 66 is slidably received in the socket 94 so that the hammer 66 can reciprocate into and out of the socket 94, with the end wall 124 operable to strike the end wall 90 of the receiver 88.

One end of the spring 68 is inserted into the bore 126 and is secured to the end wall 124 with a fastener (not shown). The opposite end of the spring 68 is generally located outside the bore 126 and attached to the plate 108 with another fastener (not shown). The spring 68 engages the plate 108 so that force is transmitted by the spring 68 from the slider 76 to the hammer 66 to urge the hammer 66 out of a held condition. During the compaction stroke, the spring 68 is also compressed to urge the hammer 66 into swift engagement with the end wall 90. In this manner, the hammer 66 creates an impulse force that is applied by the plunger head 64 to material in the chamber. While the illustrated plunger assembly 30 preferably utilizes the spring 68 to store energy, an alternative mechanism could be used to store energy for producing the impulse force. For instance, energy storage could be provided by an alternative mechanical device, such as an over-center mechanism. Also, for some aspects of the present invention, the baler could have a pneumatic or hydraulic system that provides energy storage (e.g., storage in the form of a hydraulic accumulator).

The detent assembly 70 is operable to engage the hammer 66 and release the hammer 66 in response to a predetermined amount of force applied by rods 72. In this manner, the detent assembly 70 also permits compression of the spring 68 to provide the impulse force. The detent assembly 70 is received in bores 95 presented by the receiver 88. The detent assembly 70 preferably includes six (6) sets of fasteners 132, springs 134, and bearing balls 136. The balls 136 and springs 134 are shiftably inserted in respective bores 95 so that the balls 136 can engage the outer surface of the hammer 66, either by engaging the groove 128 or another part of the outer surface. The springs 134 are operable to permit the balls 136 to yieldably engage the outer surface of the hammer 66. Thus, the springs 134 allow the balls 136 to forceably engage the outer surface while permitting the balls 136 follow the outer surface, particularly while the balls 136 are shifted into and out of engagement with the groove 128. The fasteners 132 are threaded into the bores 95 to hold the springs 134 within the bores 95, with a radially innermost end of the fastener 132 engaging the corresponding spring 134. In this manner, the springs 134 are held by the fasteners 132 so that the springs 134 urge the balls 136 into engagement with the hammer 66. The fasteners 132 are each preferably adjustable so that the radially innermost end can be selectively positioned within the bore 95. As a result, the fasteners 132 can be adjusted to adjust the force applied by the springs 134 to the balls 136.

When the hammer 66 is in the held condition relative to the receiver 88, the balls 136 engage the groove 128 to restrict movement of the hammer 66 relative to the receiver 88. When the hammer 66 is shifted out of the held condition, the balls 136 are disengaged from the groove 128 and engage the outer surface of the hammer 66 (e.g., see FIG. 9). Thus, when out of the held condition, the balls 136 permit the hammer 66 to slide into and out of the socket 94.

Figure 8:
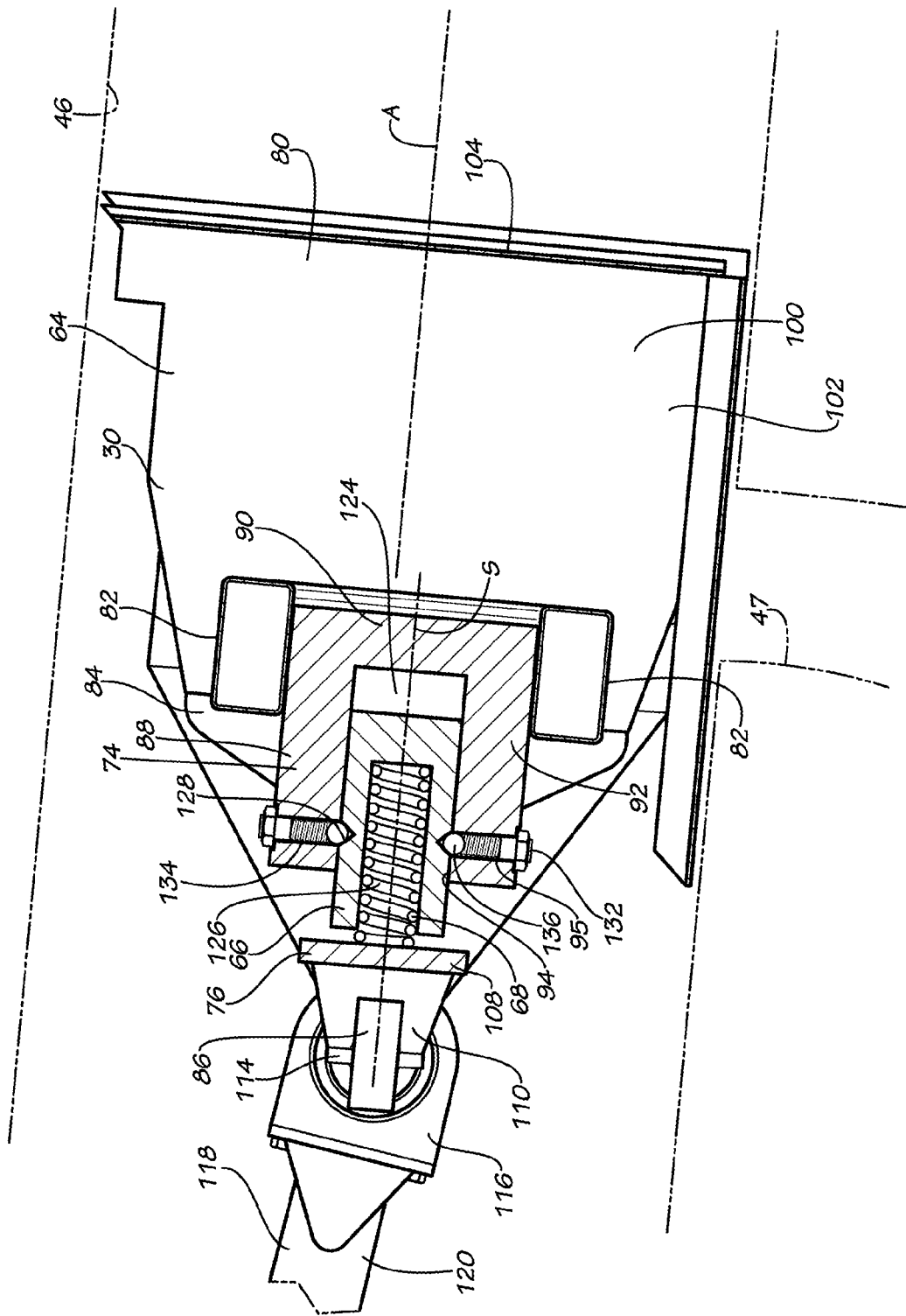
FIG. 8 is a cross section of the plunger assembly similar to FIG. 7, but showing the plunger head shifted into the innermost location, with the slider shifted to compress the spring into the hammer, and with the detent assembly holding the hammer in a held condition relative to a receiver of the head frame.
Figure 9:
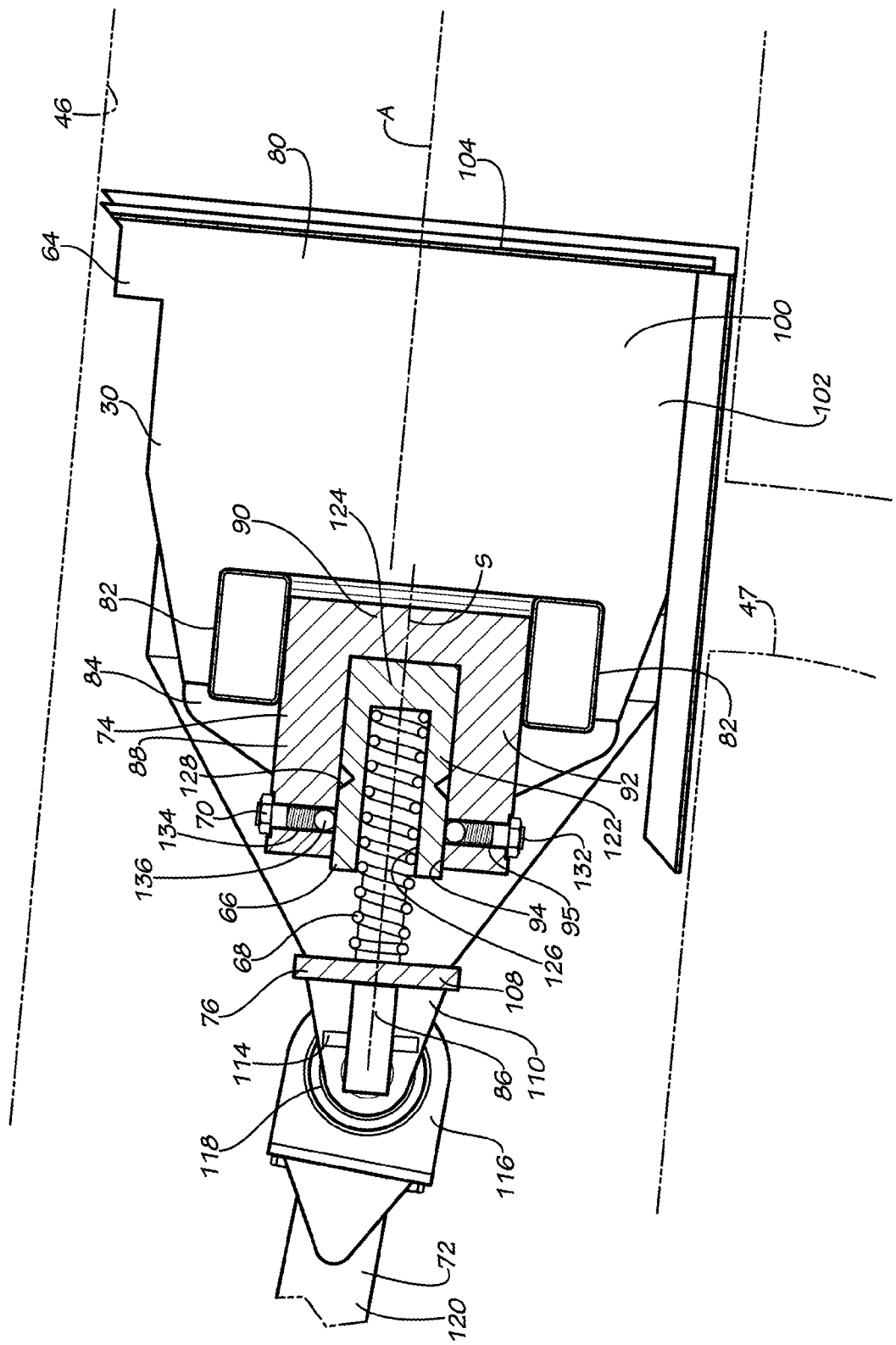
FIG. 9 is a cross section of the plunger assembly similar to FIG. 8, but showing the hammer shifted out of the held condition so that the hammer strikes an end wall of the receiver.
Figure 10:
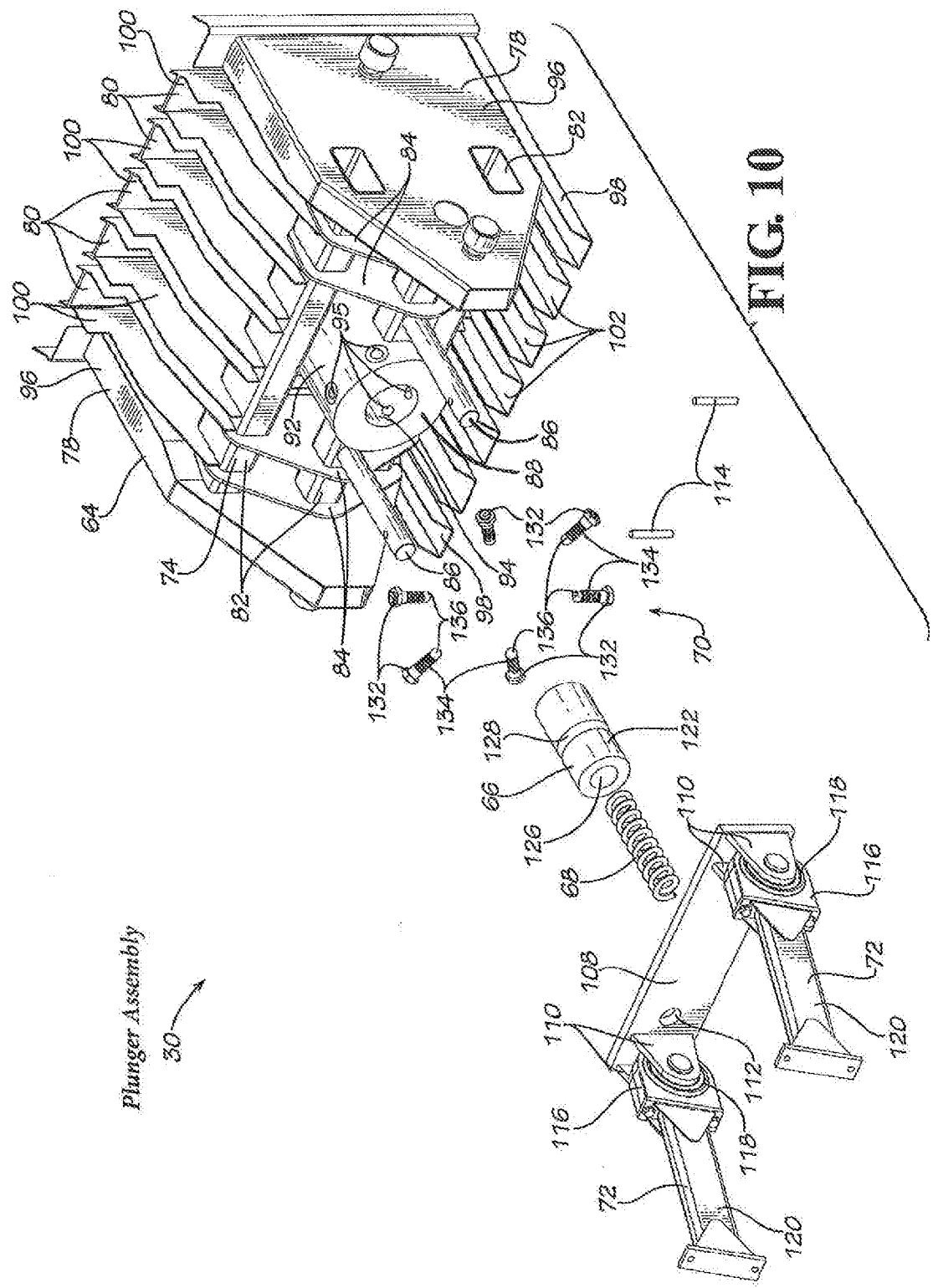
FIG. 10 is a fragmentary exploded view of the plunger assembly shown in FIGS. 1-9.

In the held condition, force applied to the slider in the aft direction causes the spring 68 to compress and thereby allows the slider 76 to move out of the extended position (see FIG. 8). As the aft force applied to the spring 68 overcomes the force applied by the detent assembly 70 to the hammer 66, the energy stored by the spring 68 swiftly moves the hammer 66 out of the held condition so that the hammer 66 strikes the end wall 90 of the receiver 88. The hammer 66 impacts the end wall 90 and generally applies the impulse force to the plunger head 64. In turn, the impulse force is applied against the material by the plunger head 64 to assist with forming the bale.

Figure 11:
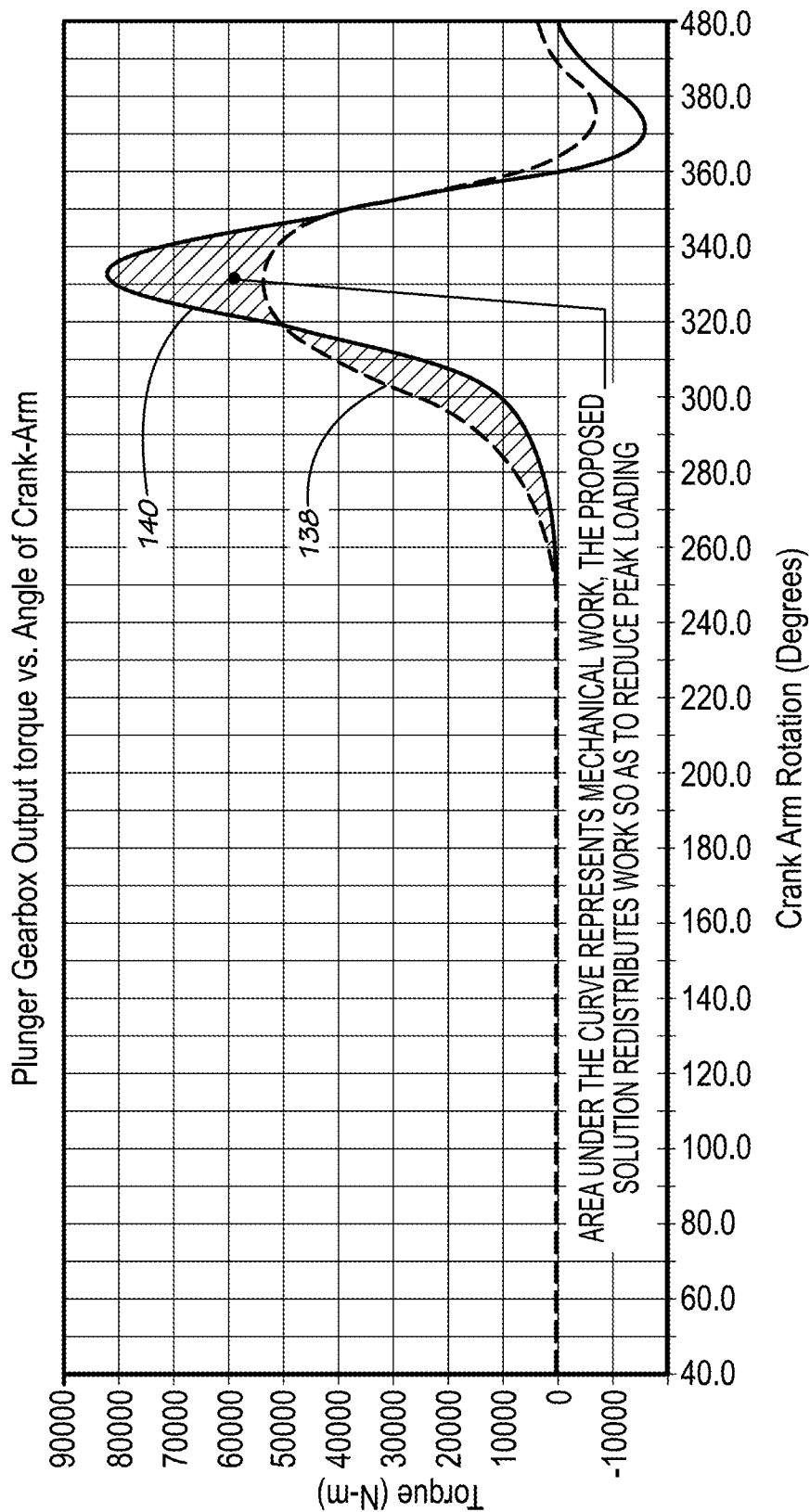
FIG. 11 is a schematic diagram comparing the torque generally applied by the plunger drive to operate the plunger of a conventional hay baler and the torque generally applied by the plunger drive to operate the plunger in the hay baler depicted in FIGS. 1-10.

Turning to FIG. 11, it has been found that the illustrated hammer, spring, and detent arrangement provides effective compaction of bale material while reducing load on baler components. A load curve 138, associated with operation of the plunger assembly 30, is depicted alongside a load curve 140, associated with operation of a conventional plunger assembly. The load curves 138,140 illustrate that the plunger assembly 30 distributes work over a larger range of crank arm rotation than the conventional plunger. Furthermore, it has been discovered that the illustrated plunger construction reduces the amount of peak torque required to be applied by the crank arms during reciprocation of the plunger. While the plunger assembly 30 preferably applies an impulse force to compact bale material, it is within the scope of the present invention where the compaction force is applied with alternative vibrational frequency components (e.g., to promote material compaction, reduce crank arm torque, etc.).

For the illustrated plunger assembly 30, the detent assembly 70 preferably cooperates with the spring 68 and hammer 66 so that the hammer 66 is driven by the spring 68 to deliver the impulse force. However, for some aspects of the present invention, an alternative mechanism could be used to store and release energy and to produce the impulse. Again, a device other than spring 68 could be used to store energy and to power the hammer 66. Also, while the detent assembly 70 is preferred for releasing the hammer 66, it is within the ambit of the present invention where an alternative hammer release is provided. For instance, the plunger could have an electronic feedback control mechanism that senses the force applied to the plunger and releases the hammer 66 when the sensed force exceeds a predetermined value.

After being released, the hammer 66 is returned to the held condition by shifting the slider 76 in the forward direction and into the extended position. The forward end of the spring 68 follows the slider 76, with the spring 68 drawing the hammer 66 in the forward direction relative to the receiver 88. The hammer 66 is drawn forwardly until the balls 136 re-engage the groove 128.

As the crank arms 50 rotate along the compaction stroke from the outermost location to the innermost location, the crank arms 50 shift the plunger assembly 30 in the aft direction, with the hammer 66 initially being in the held condition. As the crank arms 50 rotate toward the innermost location, the force applied to the slider 76 by the rods 72 generally changes in proportion to the amount of loose material in the chamber 46. Thus, for a predetermined position of the plunger within the chamber 46, the force applied to the slider 76 generally increases as the amount of material in the chamber 46 increases.

When little or no material is located in the baling chamber 46, the crank arms 50 preferably shift into the innermost location without the hammer 66 being released from the held condition. This occurs because the crank arms 50 apply a relatively small force to the plunger assembly 30 when moving into the innermost location. When more substantial amounts of loose and/or compressed material are located in the baling chamber 46, application of force by the crank arms 50 can cause the hammer 66 to be released as the plunger assembly 30 is shifted toward the innermost location.

As the crank arms 50 rotate along the retraction stroke from the innermost location to the outermost location, the crank arms 50 shift the plunger assembly 30 in the forward direction. Once the hammer 66 has been released, the hammer 66 is returned to the held condition as the crank arms 50 return the plunger assembly 30 to the outermost location. The illustrated construction of the hammer 66 and the detent assembly 70 is preferably integrated into the plunger head 64. However, for some aspects of the present invention, a similar mechanism could be alternatively provided. For instance, such a mechanism could be provided between the crank arms 50 and rods 72.

In operation, the baler 20 is powered by the tractor to collect loose material on the ground by driving the baler 20 along the ground and picking up the loose material. Furthermore, the baler 20 is powered by the tractor to compress and form the loose material into one or more bales. As the shaft is rotated by the tractor, the plunger drive 28 powers the plunger assembly 30 so that the plunger head 64 reciprocates into and out of the baling chamber 46.

Specifically, the plunger head 64 is driven along the compaction stroke from the outermost location to the innermost location. The plunger head 64 is then driven along the retraction stroke from the innermost location to the outermost location. As the plunger head 64 moves along the compaction stroke, the plunger head 64 generally engages any loose and/or compacted material in the chamber.

When little or no loose and/or compacted material is located in the baling chamber 46, the crank arms 50 generally shift into the innermost location without the hammer 66 being released from the held condition. When more substantial amounts of loose and/or compacted material are located in the baling chamber 46, application of force by the crank arms 50 can cause the hammer 66 to be released as the plunger assembly 30 is shifted toward the innermost location.

As the plunger head 64 moves along the retraction stroke, the crank arms 50 shift the plunger assembly 30 in the forward direction. When the hammer 66 has been released, the hammer 66 is returned to the held condition as the crank arms 50 return the plunger assembly 30 to the outer most location.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A powered square baler operable to form a bale by compressing loose material, the powered square baler comprising:
    a chassis including a baler frame that presents a baling chamber to receive the loose material; and
    a reciprocating plunger assembly including a plunger head and an impulse device having a groove formed therein, the plunger head being slidably mounted relative to the frame and operable to be driven by a power source to reciprocate into and out of the chamber and apply a compressive force against the loose material, wherein the plunger head comprises a receiver having an end wall and a detent assembly for engaging the groove of the impulse device, the receiver operable to slidably receive the impulse device so that the impulse device can reciprocate into and out of the receiver, with an end wall of the impulse device operable to strike the end wall of the receiver such that the impulse device transmits energy to the plunger head, with the transmitted energy causing an impulse force to be applied against the loose material by the plunger head.

2. A powered square baler operable to form a bale by compressing loose material, the powered square baler comprising:
    a chassis including a baler frame that presents a baling chamber to receive the loose material;
    a plunger drive comprising at least one crank arm; and
    a reciprocating plunger assembly, the reciprocating plunger assembly comprising a plunger head, an impulse device, a detent assembly, and an energy storage device, the plunger head being slidably mounted relative to the frame and operable to be driven by the plunger drive to reciprocate into and out of the chamber along a chamber axis and apply a compressive force against the loose material, the impulse device being configured to at least partly receive the energy storage device and having a groove formed therein configured to operably engage the detent assembly, and wherein the detent assembly permits compression of the energy storage device such that the energy storage device is configured to store energy from the plunger drive and upon release of the detent assembly, cause the impulse device to strike the plunger head and transmit energy to the plunger head, with the transmitted energy causing an impulse force to be applied against the loose material by the plunger head.

3. The powered square baler of claim 2 wherein the plunger head comprises a head frame, wherein the head frame comprises a receiver operable to slidably receive the impulse device, wherein the receiver includes an end wall and side walls that cooperatively present a socket, the socket having a socket axis that is parallel to the chamber axis.

4. The powered square baler of claim 3 wherein the side walls form a cylindrical tube.

5. The powered square baler of claim 3 wherein the side walls of the receiver have a plurality of radial bores formed therein, wherein the radial bores intersect the socket and are spaced circumferentially about the socket, said radial bores configured to receive the detent assembly.

6. The powered square baler of claim 5 wherein the detent assembly is comprised of a plurality of sets of springs and bearing balls, wherein one of said plurality of sets comprising one spring and one bearing ball is received in each of the plurality of radial bores presented by the receiver, wherein said spring and bearing ball are shiftably inserted in its respective bore so that the bearing ball engages a groove in an outer surface of the impulse device, and wherein the spring is operable to permit the bearing balls to yieldably engage the outer surface of the impulse device thereby allowing the bearing ball to forceably engage the groove in the outer surface while permitting the bearing ball follow the outer surface while the bearing ball is shifted into and out of engagement with the groove.

7. The powered square baler of claim 3 wherein the plunger head comprises at least one slider rod and a slider, wherein the slider has holes that receive the at least one slider rod with the slider being shiftable relative to the head frame along the chamber axis into and out of an extended position.

8. The powered square baler of claim 7 wherein the plunger head comprises at least one connecting rod, wherein a first end of the at least one connecting rod is pivotally attached to the at least one crank arm and a second end of the at least one connecting rod is attached to the slider such that the at least one connecting rod drivingly interconnects the at least one crank arm and slider so that rotation of the at least one crank arm causes reciprocating sliding movement of the slider into and out of the extended position.

9. The powered square baler of claim 8 wherein the detent assembly is operable to engage the impulse device and release the impulse device in response to a predetermined amount of force applied by the at least one connecting rod.

10. The powered square baler of claim 7 wherein the energy storage devices engages the slider so that force is transmitted by the energy storage device from the slider to the impulse device to urge the impulse device out of a held condition.

* * * * *